US011363800B2

(12) United States Patent
Melgoza

(10) Patent No.: US 11,363,800 B2
(45) Date of Patent: Jun. 21, 2022

(54) WEARABLE PET TOY SELECTIVELY AFFIXED TO APPAREL

(71) Applicant: Little Horse Product Group LLC, Huntington, VT (US)

(72) Inventor: Martin Melgoza, Huntington, VT (US)

(73) Assignee: Little Horse Product Group LLC, Huntington, VT (US)

( * ) Notice: Subject to any disclaimer, the term of this patent is extended or adjusted under 35 U.S.C. 154(b) by 349 days.

(21) Appl. No.: 16/676,433

(22) Filed: Nov. 7, 2019

(65) Prior Publication Data

US 2020/0146261 A1   May 14, 2020

Related U.S. Application Data

(60) Provisional application No. 62/757,303, filed on Nov. 8, 2018.

(51) Int. Cl.
*A01K 15/02* (2006.01)
*A43C 19/00* (2006.01)

(52) U.S. Cl.
CPC ............ *A01K 15/025* (2013.01); *A43C 19/00* (2013.01)

(58) Field of Classification Search
CPC ...... A01K 15/025; A01K 15/02; A43C 19/00; A43B 3/0031
See application file for complete search history.

(56) References Cited

U.S. PATENT DOCUMENTS

| 5,322,036 | A | * | 6/1994 | Merino | A63H 15/04 |
| | | | | | 119/707 |
| 5,657,721 | A | * | 8/1997 | Mayfield | A01K 15/025 |
| | | | | | 119/707 |
| 5,829,391 | A | * | 11/1998 | Krietzman | A01K 15/025 |
| | | | | | 119/708 |
| 5,830,035 | A | * | 11/1998 | Budreck | A63H 3/14 |
| | | | | | 446/366 |
| 5,924,387 | A | * | 7/1999 | Schramer | A01K 15/025 |
| | | | | | 119/708 |
| 2006/0054105 | A1 | * | 3/2006 | Renforth | A01K 15/025 |
| | | | | | 119/708 |
| 2008/0230013 | A1 | * | 9/2008 | Man | A01K 15/025 |
| | | | | | 119/708 |
| 2020/0390064 | A1 | * | 12/2020 | Krieger | A43C 19/00 |

FOREIGN PATENT DOCUMENTS

KR       20200134624 A   * 12/2020
KR       20210061058 A   *  5/2021

* cited by examiner

*Primary Examiner* — Trinh T Nguyen
(74) *Attorney, Agent, or Firm* — Polsinelli LLP

(57) ABSTRACT

A pet chew toy selectively affixed to footwear is disclosed. In combination, the he invention having several main parts comprising: a chew toy, a shoe (such as a slipper and the like), an anchor plate and a T-clip. Said anchor plate being sewn into the shoe and having a T-shaped slot configured to receive said T-clip also sewn into a chew toy. The connection apparatus allowing a user to selectively swap out various chew toys according to the preference of a user and their pet. An object of the invention is to provide hands-free entertainment for a pet while allowing a user to perform other tasks.

26 Claims, 3 Drawing Sheets

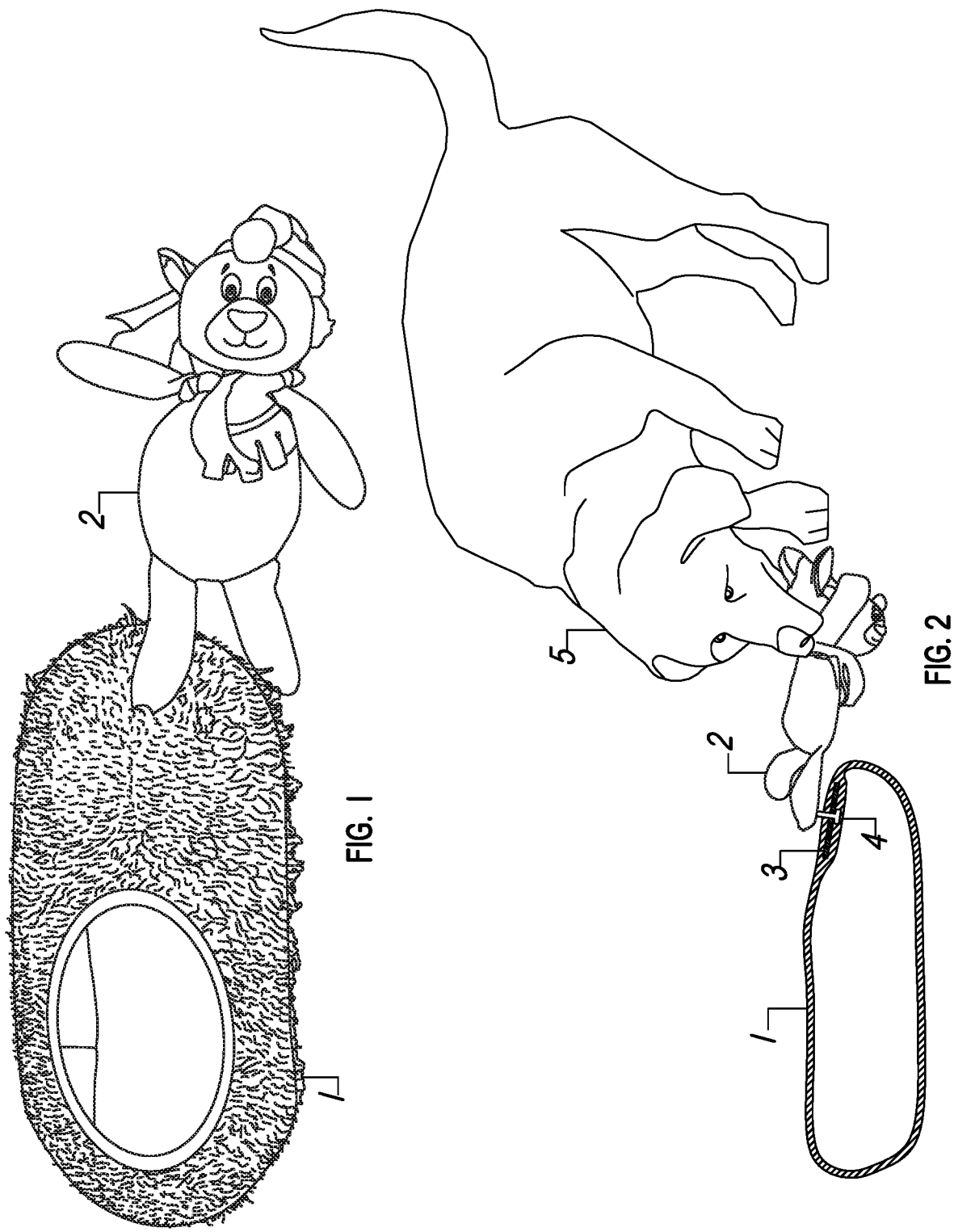

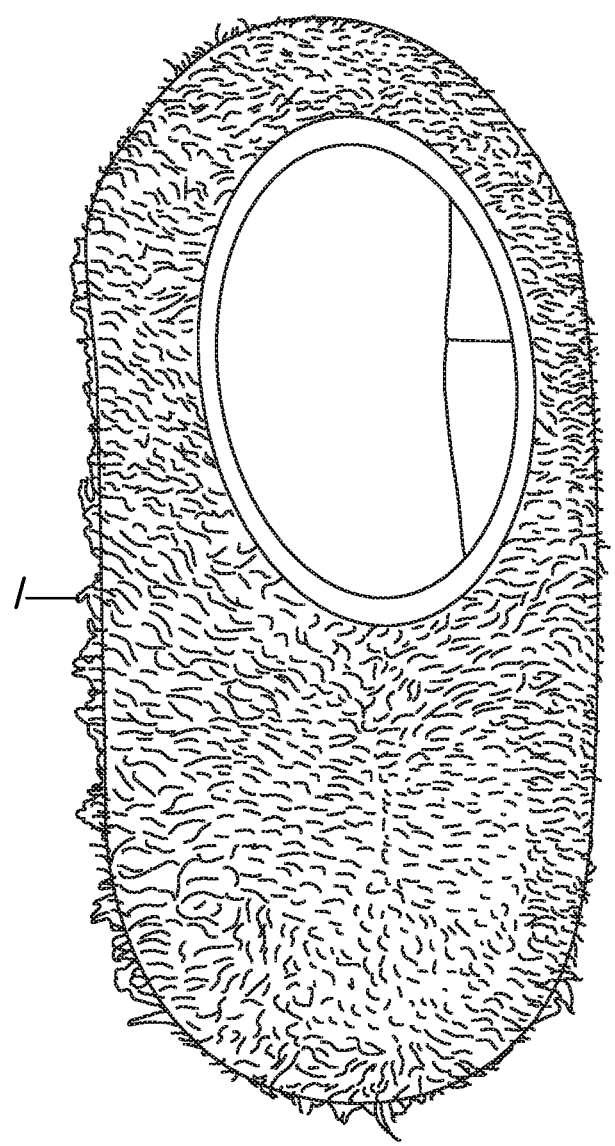
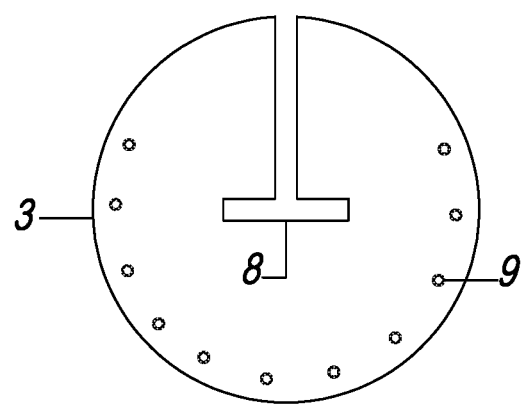
FIG. 3

WEARABLE PET TOY SELECTIVELY AFFIXED TO APPAREL

CROSS-REFERENCE TO RELATED APPLICATIONS

The present patent application claims the priority benefit of U.S. provisional patent application 62/757,303 filed Nov. 8, 2018, the disclosure of which is incorporated by reference herein.

BACKGROUND OF THE INVENTION

1. Field of the Invention

The present invention generally relates to pet toys. More specifically, the present invention relates to a wearable pet chew toy selectively affixed to footwear.

2. Description of the Related Art

Early pet toys were made of rope, rawhide and wood to help dogs maintain their chewing habits. The industry of pet chew toys emerged with the availability and enhanced production of rubber in the 1950s. Presently available pet products include edible chew treats, non-edible chew toys, interactive toys, and dental solutions for pets of a range of sizes and chew strengths. In addition, the classic rope-based chew toy is still a prominent part of pet product company offerings and may further include a range of braided and tied rope-based toys in different shapes (e.g., snake and iguana), and with squeak and tennis ball components.

Such toy offerings may further include a stuffable rubber dog toy that was easy on dog teeth, as well as elongated chew toys made of soft yet durable Zogoflex material in a hollow, buoyant configuration that has a random bounce so as to engage a dog's hunting instincts. While many such toys have been developed to engage a pet's needs to fetch and chew, none were designed to challenge an animal's instinct to play by way of pulling against their human companions directly.

There is, therefore, a need in the art for improved wearable pet toys that selectively affix to human apparel, including footwear.

SUMMARY OF THE INVENTION

The device herein disclosed and described provides a solution to the shortcomings in the prior art through the disclosure of a wearable pet chew toy selectively affixed to apparel (e.g., footwear). An object of the invention is to allow a user to play with their dog while performing other tasks. For example, a user working at home at a desk dons the footwear (or apparel or other wearable item). A pet, interested in playing with their human companion may therefore be allowed to chew on the toy while simultaneously being engaged and challenged by movement of the toy. The user can play with the dog, for example, by pulling the toy away during normal movement (e.g., walking). While such play is taking place, the user's hands may remain free to perform a variety of other tasks and activities.

In various embodiments of the invention, the specific toys may be selectively attached, detached, and re-attached. As such, different toys may be switched per set of footwear. For example, if a pet destroys a toy, the user can simply affix another toy to the footwear. The footwear attachment may include an anchor plate with a slot, which may be attached (e.g., sewn) to an upper sole portion. When a new toy is needed, the user simply detaches (e.g., twists off) the old toy and installs a new toy.

BRIEF DESCRIPTION OF THE FIGURES

FIG. 1 illustrates a top plan view of an exemplary wearable toy affixed to footwear.

FIG. 2 illustrates a side sectional view of an exemplary wearable toy affixed to footwear during use with a dog.

FIG. 3 illustrates a top plan view of exemplary footwear that may be used with wearable toys and from which the anchor plate has been detached.

DETAILED DESCRIPTION

Figure 4C:
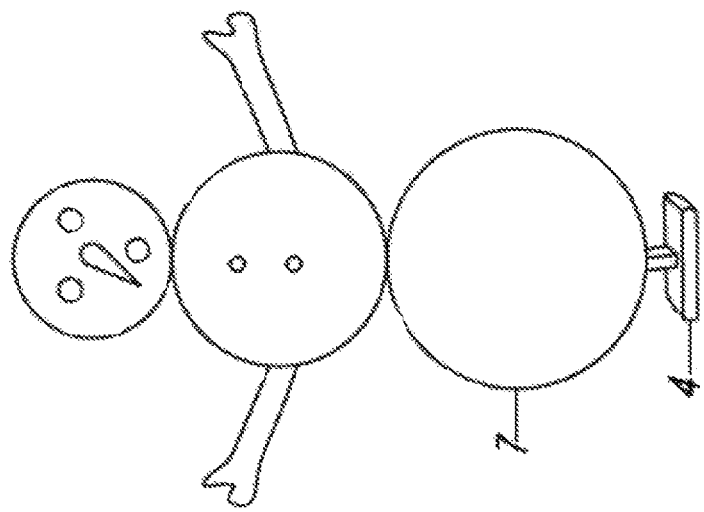
FIGS. 4A-C illustrate an exemplary variety of different wearable toys that may be affixed to footwear.

FIG. 1 illustrates a top plan view of an exemplary wearable toy 2 affixed to footwear 1. As illustrated, footwear 1 may be configured in a conventional slipper form. Other embodiments of footwear 1 may further include sneakers, sandals, boots, and other types of shoes known in the art. Footwear 1 may be selectively affixed by way of an attachment mechanism (discussed in further detail below) to wearable toy 2. While such an attachment mechanism may be integrated in some embodiments of footwear 1, other embodiments may allow for existing footwear 1 of a user to be adapted to affix to wearable toy 2. For example, footwear 1 may be inclusive of a sock or shoe cover that may be worn over existing shoes.

Meanwhile, wearable toy 2 may be configured in a variety of different toy configurations, including stuffed animal, rope, etc. Such wearable toy 2 may be attachable to and detachable from an attachment mechanism of footwear 1. As such, a user may remove toys for variety, cleaning, replacement, and other purposes.

FIG. 2 illustrates a side sectional view of an exemplary wearable toy 2 affixed to footwear 1 during use with a dog 5. A user (not pictured) wearing the footwear 1 may therefore move the footwear 1 during the course of normal movement. Such movement, however, also causes the affixed wearable toy 2 to move, thereby engaging the dog's attention and instincts for play, chasing, and chewing. The cross-sectional view of FIG. 2 further illustrates that wearable toy 2 is selectively affixed to footwear 1 by means of anchor plate 3 selectively affixed to clip 4.

FIG. 3 illustrates a top plan view of exemplary footwear 1 that may be used with wearable toys and from which the anchor plate 3 has been detached. As illustrated, anchor plate 3 may have a planar, cylindrical shape with T-shaped slot 8 configured proximally to receive a clip 4. In some embodiments, clip 4 may attach to anchor plate 3 by way of twisting into slot 8, as well as removed by further twisting (e.g., in a different direction or into a different configuration).

Anchor plate 3 may also have a plurality of apertures disposed radially along a distal portion of anchor plate 3. Such apertures may allow anchor plate 3 to be sewn (e.g., into a pocket) to footwear 1. The anchor plate 3 may be made of a rigid material such as, but not limited to plastic, metal and the like.

Figure 4B:
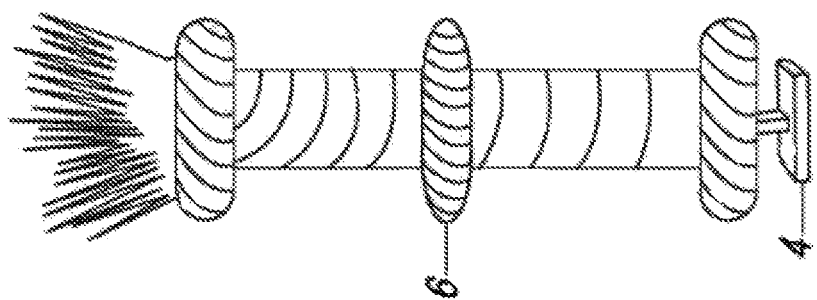
Figure 4A:
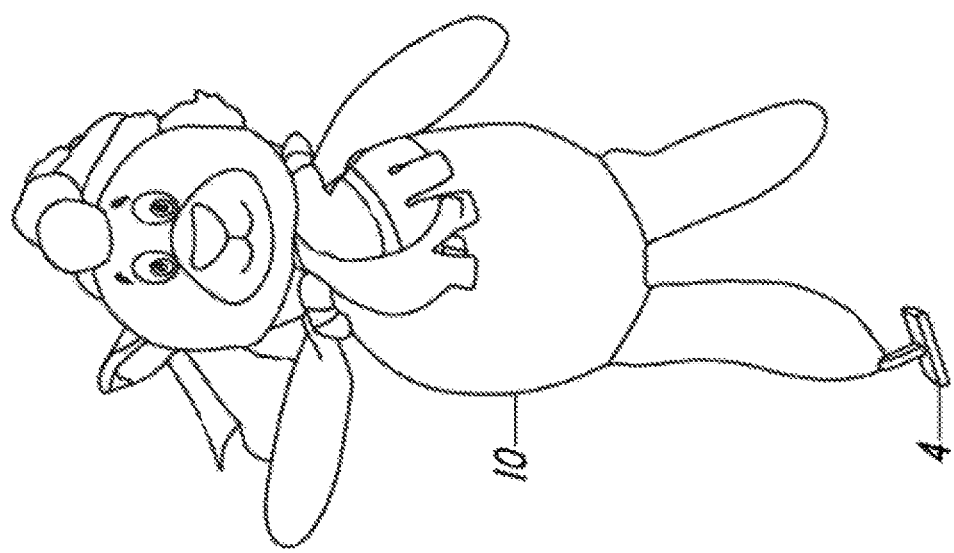

FIGS. 4A-C illustrate an exemplary variety of different wearable toys that may be affixed to footwear. As illustrated, such toy configurations may include common pet toy configurations such as a stuffed animal 10, rope 4, or snowman 7. Other design configurations may be encompassed herein. Regardless of particular design, however, embodiments of pet toy 2 may be selectively affixed to the footwear 1 component by means of clip 4. Clip 4 may be configured as a T-shaped member capable of being fixedly connected to pet toy 2 by means of, but not limited to sewn thread, adhesives, Velcro, buckles, snaps, buttons, ties, and other types of connectors It is additionally noted and anticipated that although the device is shown in its most simple form, various components and aspects of the device may be differently shaped or slightly modified when forming the invention herein. As such those skilled in the art will appreciate the descriptions and depictions set forth in this disclosure or merely meant to portray examples of preferred modes within the overall scope and intent of the invention, and are not to be considered limiting in any manner. While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention.

The foregoing detailed description of the technology has therefore been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claims.

What is claimed is:

1. A wearable toy system comprising:
   a toy portion attached to a first connector; and
   a wearable portion configured as an apparel item attached to a second connector, the second connector configured to removably attach to the first connector, wherein the second connector is an anchor plate that includes a slot, and wherein the first connector fits into the slot and engages the anchor plate upon being twisted.

2. The system of claim 1, wherein at least part of the toy portion is made of a flexible material.

3. The system of claim 1, wherein the first connector is a clip configured as a T-shape.

4. The system of claim 1, wherein the toy portion is attached to the first connector by at least one of sewn thread, adhesive, Velcro, buckle, snap, button, or tie.

5. The system of claim 1, wherein the apparel item is footwear, and wherein the wearable portion is configured to be worn on a foot of a user.

6. The system of claim 5, wherein the footwear includes at least one of a sneaker, a sandal, a boot, a sock, and a shoe cover.

7. The system of claim 1, wherein the wearable portion further includes a pocket configured to hold the second connector.

8. The system of claim 1, wherein the second connector further includes one or more perforations.

9. The system of claim 8, wherein the perforations engage with thread that connects to the wearable portion.

10. A wearable toy system comprising:
    a toy portion attached to a first connector; and
    a wearable portion configured as an apparel item attached to a second connector, the second connector configured to removably attach to the first connector, wherein the wearable portion further includes a pocket configured to hold the second connector.

11. The system of claim 10, wherein at least part of the toy portion is made of a flexible material.

12. The system of claim 10, wherein the first connector is a clip configured as a T-shape.

13. The system of claim 12, wherein the second connector is an anchor plate that includes a slot, wherein the T-shape of the slip fits into the slot and engages the anchor plate upon being twisted.

14. The system of claim 10, wherein the toy portion is attached to the first connector by at least one of sewn thread, adhesive, Velcro, buckle, snap, button, or tie.

15. The system of claim 10, wherein the apparel item is footwear, and wherein the wearable portion is configured to be worn on a foot of a user.

16. The system of claim 5, wherein the footwear includes at least one of a sneaker, a sandal, a boot, a sock, and a shoe cover.

17. The system of claim 10, wherein the second connector further includes one or more perforations.

18. The system of claim 17, wherein the perforations engage with thread that connects to the wearable portion.

19. A wearable toy system comprising:
    a toy portion attached to a first connector; and
    a wearable portion configured as an apparel item attached to a second connector, the second connector configured to removably attach to the first connector, wherein the second connector further includes one or more perforations that engage with thread that connects to the wearable portion.

20. The system of claim 19, wherein at least part of the toy portion is made of a flexible material.

21. The system of claim 19, wherein the first connector is a clip configured as a T-shape.

22. The system of claim 21, wherein the second connector is an anchor plate that includes a slot, wherein the T-shape of the slip fits into the slot and engages the anchor plate upon being twisted.

23. The system of claim 19, wherein the toy portion is attached to the first connector by at least one of sewn thread, adhesive, Velcro, buckle, snap, button, or tie.

24. The system of claim 19, wherein the apparel item is footwear, and wherein the wearable portion is configured to be worn on a foot of a user.

25. The system of claim 24, wherein the footwear includes at least one of a sneaker, a sandal, a boot, a sock, and a shoe cover.

26. The system of claim 19, wherein the wearable portion further includes a pocket configured to hold the second connector.

* * * * *